July 23, 1929.  A. O. ABBOTT, JR  1,721,583

VULCANIZING BAG

Filed July 20, 1928

INVENTOR
Adrian O. Abbott, Jr.
BY
Ernest Hopkinson
ATTORNEY

Patented July 23, 1929.

1,721,583

UNITED STATES PATENT OFFICE.

ADRIAN O. ABBOTT, JR., OF DETROIT, MICHIGAN, ASSIGNOR TO MORGAN AND WRIGHT, OF DETROIT, MICHIGAN, A CORPORATION OF MICHIGAN.

VULCANIZING BAG.

Application filed July 20, 1928. Serial No. 294,087.

This invention relates generally to curing bags for tire casings. The principal object is to provide a bag of this character adapted not only to perform its usual function of applying fluid pressure to the interior of the casing, but which is effective to form notches in the opposite toe portions of the beads whereby to provide clearance for a valve stem when an inner tube is assembled with the finished casing.

The invention has particular application to casings of the clincher type having soft beads and wherein the opposite toe portions of the beads are so close together as to ordinarily preclude passage of the valve stem.

Formerly, it was necessary to cut the clearance notches by hand or machine, and this required cutting through the fabric, usually leaving a sharp edge around the notch on the inside of the casing. This was objectionable on account of the tendency to injure the inner tube. Furthermore, all cutting methods have not been entirely satisfactory on account of irregularity of the notches produced, in that the toes of the beads vary and the notches are consequently cut too deep in some cases and not deep enough in others.

In carrying out the present invention, the curing bag is provided at its inner periphery with a pair of oppositely disposed rounded lugs which are arranged to engage and press notches into the toes of the green casing during the process of molding, the lugs being preferably composed of vulcanized rubber composition integral with the bag. By thus forming the notches during the curing operation, the need of later cutting the notches is done away with and any objectionably sharp edges or variations in the notches does not occur. Also, there is a saving of considerable labor in producing the finished tire.

In the accompanying drawings which illustrate one practical embodiment of the invention, Fig. 1 is a cross section of a tire mold with the curing bag in position;

Figure 1:
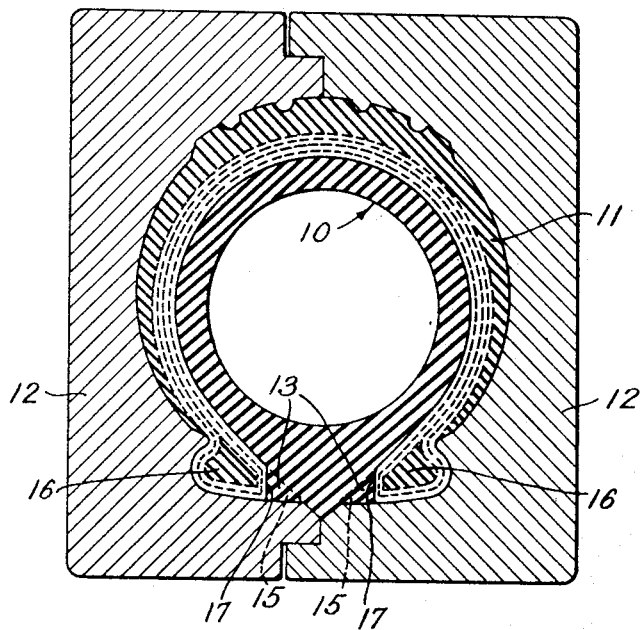
Figure 2:
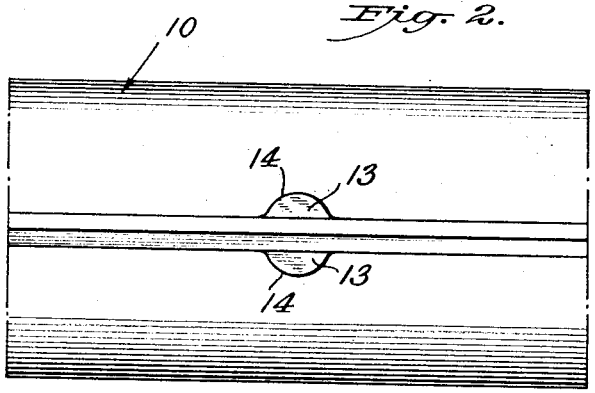
Fig. 2 illustrates the lugs on the curing bag.
Figure 3:
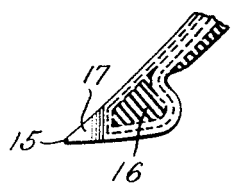
Fig. 3 represents the character of notches formed by the lugs.

Referring to the drawing, reference character 10 indicates generally a curing bag which is usually in the form of an annular tube composed of vulcanized rubber composition and adapted to exert pressure against the inner wall of a tire casing 11 held under ram pressure applied to a pair of cooperating mold sections 12, as will be readily understood by those skilled in the art.

The annular curing bag 10 is provided adjacent its inner periphery with a pair of oppositely disposed lugs 13 preferably composed of vulcanized rubber composition of suitable consistency and integral with the body of the bag 10, the lugs 13 being rounded outward in opposite directions as at 14 to correspond substantially to the size and contour of the valve stem of an inner tube to be assembled with the finished casing. It will be observed that the rubber lugs 13 engage the toe portions 15 of the soft beads 16, and that when the usual ram pressure is applied to force the mold sections 12 together, that the heat of the molds combined with the pressure exerted by the lugs against the toe portions 15 causes the formation therein of notches 17 of the desired shape to provide for the passage of a valve stem. During the application of heat and pressure to the mold sections 12, the toe portions 15 are pressed inward and the fabric component of the bead 16 may undergo a rearrangement substantially as indicated in the drawing, that is, the fabric is merely pushed back into the body of the bead 16 and the strength of the bead at this point is therefore unimpaired. The advantages of this, as compared with cutting the clearance notches 17, will be readily appreciated.

Furthermore, unlike cutting, the notched portions of the bead present smooth unbroken surfaces devoid of objectionably sharp edges, and the notches 13 are uniform in size and shape. In addition to this superiority in workmanship, there is a material saving of labor in view of the fact that the casing is both cured and notched in one operation.

It is obvious that the size, shape, composition of the lugs, and the manner of associating the latter with the curing bag, may be varied to suit particular conditions of molding, and it is consequently not intended to limit the invention to the single embodiment illustrated herein.

Having thus described my invention what I claim and desire to protect by Letters Pattent is:

1. A curing bag for use in molding a tire casing, comprising an annular bag provided at its inner periphery with a pair of oppositely disposed lugs adapted to form notches in the opposite toe portions of the tire casing.

2. A curing bag for use in molding a tire casing, comprising an annular bag provided at its inner periphery with a pair of oppositely disposed lugs adapted to form notches in the opposite toe portions of the tire casing, the bag and the lugs being of vulcanized rubber composition.

3. A curing bag for use in molding a tire casing, comprising an annular bag provided at its inner periphery with a pair of oppositely disposed lugs adapted to form notches in the opposite toe portions of the tire casing, the lugs being integral with the bag, the whole being of vulcanized rubber composition.

4. A curing bag for use in molding a tire casing, comprising an annular bag provided at in inner periphery with a pair of oppositely disposed lugs which are rounded outward in opposite directions and adapted to form correspondingly shaped notches in the opposite toe portions of the tire casing, the lugs and the bag comprising vulcanized rubber composition, said lugs being integral with the bag.

5. A curing bag for use in molding a tire casing, provided with a pair of oppositely disposed vulcanized rubber lugs located to engage the opposite toe portions of a green casing and cause the formation therein of notches corresponding substantially to the shape of the lugs.

Signed at Detroit, county of Wayne, State of Michigan, this 16th day of July, 1928.

ADRIAN O. ABBOTT, Jr.